US012755029B2

(12) United States Patent
Wade

(10) Patent No.: US 12,755,029 B2
(45) Date of Patent: Oct. 6, 2026

(54) SYSTEM AND METHOD FOR PROVIDING A SELF-ENCRYPTING STORAGE MEDIUM WITH AN INTEGRATED NON-VOLATILE DISPLAY UNIT

(71) Applicant: Jack Wade, La Jolla, CA (US)

(72) Inventor: Jack Wade, La Jolla, CA (US)

( * ) Notice: Subject to any disclaimer, the term of this patent is extended or adjusted under 35 U.S.C. 154(b) by 45 days.

(21) Appl. No.: 18/135,719

(22) Filed: Apr. 17, 2023

(65) Prior Publication Data

US 2023/0376613 A1 Nov. 23, 2023

Related U.S. Application Data

(63) Continuation of application No. 16/892,111, filed on Jun. 3, 2020, now abandoned.

(60) Provisional application No. 62/865,132, filed on Jun. 21, 2019.

(51) Int. Cl.
*G06F 21/60* (2013.01)
*G06F 21/62* (2013.01)
*G06F 40/106* (2020.01)

(52) U.S. Cl.
CPC ........ *G06F 21/602* (2013.01); *G06F 21/6227* (2013.01); *G06F 40/106* (2020.01)

(58) Field of Classification Search
CPC ... G06F 21/602; G06F 21/6227; G06F 40/106
See application file for complete search history.

(56) References Cited

U.S. PATENT DOCUMENTS 7,483,983 B1 * 1/2009 Bonefas ................ H04L 67/565 709/226
8,131,883 B1 * 3/2012 Reisman ............ G06Q 30/0609 709/215
8,826,036 B1 * 9/2014 Snodgrass ........... G06F 21/1011 713/168
9,086,917 B1 * 7/2015 Fitzgerald ........... G06F 9/45558
9,626,080 B1 * 4/2017 Labaj ......................... G06F 3/00
9,818,148 B2 * 11/2017 Bynum .............. G06Q 30/0261
12,148,326 B2 * 11/2024 Huang ..................... G09F 9/372
2002/0194074 A1 * 12/2002 Jacobs ................... G07G 1/145 705/16
2006/0049248 A1 * 3/2006 Becker ................. G06Q 10/087 235/385
2007/0046560 A1 * 3/2007 Neugebauer .............. G09F 9/30 345/1.1
2010/0031054 A1 * 2/2010 Starr ................... G06F 21/6218 711/111

(Continued)

*Primary Examiner* — Scott T Baderman
*Assistant Examiner* — Mario M Velez-Lopez
(74) *Attorney, Agent, or Firm* — Olivo IP Law Group, P.C.; John W. Olivo, Jr.

(57) ABSTRACT

A system for a storage medium that provides a method of integrating a non-volatile display, such as an e-paper with an electronic storage medium, and including a self-encrypting solid-state memory device. The system utilizes existing e-paper technology coupled with a receiver that can access various types of information to be displayed on the e-paper. This information can be dynamic user data, administrative data, security data, or other information. The receiver may obtain this information via wireless communication, through meta data on the storage medium, through a direct link through the storage medium or other related methodology.

20 Claims, 7 Drawing Sheets

(56) References Cited

U.S. PATENT DOCUMENTS

2011/0283043 A1* 11/2011 Schuette ............. G06F 12/0246
711/E12.008
2012/0000974 A1* 1/2012 Hung ...................... G06F 3/147
235/375
2012/0139693 A1* 6/2012 Zucker ............. H04N 21/44008
340/5.2
2012/0166817 A1* 6/2012 Wu ......................... G06F 21/79
713/193
2014/0040639 A1* 2/2014 Raam ...................... G06F 21/78
713/193
2014/0187856 A1* 7/2014 Holoien ................. G16H 30/40
600/103
2014/0310805 A1* 10/2014 Kandekar ............. H04L 63/083
726/19
2015/0269497 A1* 9/2015 Barnett ..................... H04L 9/14
705/51
2016/0004879 A1* 1/2016 Fisher ................... G06F 21/805
713/193
2016/0041768 A1* 2/2016 Riahi .................... G06F 3/0673
711/166
2016/0048907 A1* 2/2016 Park ................... G06Q 30/0641
345/634
2016/0078245 A1* 3/2016 Amarendran .......... G06N 20/00
713/193
2016/0196081 A1* 7/2016 Carlson ................. G06F 3/0686
713/193
2017/0011313 A1* 1/2017 Pochert ................. G06F 3/0481
2017/0068277 A1* 3/2017 Cohen ....................... G06F 3/03
2019/0231644 A1* 8/2019 Fisher .................... G05B 15/02
2020/0401707 A1* 12/2020 Wade ...................... G06F 21/79
2024/0168666 A1* 5/2024 Jung ..................... G06F 3/0679

* cited by examiner

600

601

Unique Features
Non-volatile display for Removable Storage Device
Updated by communication with paired host

603

| | |
|---|---|
| Identity: | Mission ECW |
| Security Class: | TS/SCI |
| Encrypt Status: | LOCKED |
| Date Loaded: | 21APR20 |
| Serial Number: | 12345 |
| Owner: | Paul R |
| Date Last Use: | 21APR20 |
| PowerOn Hours: | 126 |
| Capacity: | 1.2TB avail/2TB |
| Last Backup: | NA |

Logo

SYSTEM AND METHOD FOR PROVIDING A SELF-ENCRYPTING STORAGE MEDIUM WITH AN INTEGRATED NON-VOLATILE DISPLAY UNIT

CROSS REFERENCE TO RELATED APPLICATIONS

This application is a continuation of U.S. patent application Ser. No. 16/892,111, filed Jun. 3, 2020, which claims the benefit of U.S. Provisional Patent Application Ser. No. 62/865,132, filed on Jun. 21, 2019, the contents of which are incorporated herein by reference.

BACKGROUND OF THE INVENTION

Making a Hollywood-style movie is a high-stakes business. Film studios typically invest many millions of dollars to hire actors, rent locations, and employ hundreds of makeup artists and designers and other production personnel. If the movie is a success, a film studio can earn many times its initial investment. However, with highly complex projects and very high operational costs, overruns are a constant risk. To remain profitable studios must ensure projects stay on schedule and operate within tight budget controls. Production costs, which typically include the cost of filming over a period of months and at various locations, represent the greatest budget risk for a project. Innovations that improve efficiency, productivity, and security during filming can significantly affect the success of the project and profitability for movie studios.

On a given day during production, a cinematographer will oversee the filming of a number of segments of the movie storyline which are referred to as scenes. A scene is generally thought of as the action in a single location and continuous time. Still, the division of a movie into scenes is usually determined by the script. At the end of each day of filming, the recorded scenes for the day, which are referred to as the dailies, must be transferred from the camera and delivered to the studio for viewing the following day by the director and producers.

The workflow for gathering and delivering the dailies hasn't changed significantly from the early days of movie making when cameras recorded scenes on celluloid film. Today cameras record scenes on to a digital media device inserted into the camera instead of film, but the process is the same. During filming, each scene begins with a shot of the clapperboard, a handheld device used in filmmaking to assist in synchronizing of picture and sound. The clapperboard is also used to designate and mark the various scenes and takes as they are filmed. Typically, many scenes are recorded each day and at the end of the day the recorded scenes are transferred from the camera to a storage device such as a SSD. A handwritten label is then affixed to the SSD which describes the contents of the media, i.e. which scenes are included. Processing and delivering the dailies is a manual process and there are several points where things could go wrong. First, since the contents of the camera media is not encrypted, if lost or stolen the recordings could be misused. Second, the process requires removing the digital media device from the camera and copying the contents to another device such as a SSD. This is time consuming and error prone because, 1) a new label must be handwritten, 2) the new label may not accurately reflect the contents or it could fall off and be lost, and 3) it creates a second unencrypted copy of the dailies which could be lost or stolen.

Filmmaking is just one of many applications that faces challenges in collecting and transporting data in a secure fashion. For example, in 2000 the FBI investigated the disappearance of two hard drives from a vault in the Super-Secret X-division of the Los Alamos National Laboratory. Eleven days later the hard drives, which contained nuclear weapons secrets, mysteriously reappeared behind a copy machine. Incidents of lost removable media have since occurred at Los Alamos, including one case where the drives were traded for methamphetamine. The reality is that removable drives have always been difficult to keep track of and are frequently lost or stollen. Security best practices typically involve storing the drives under lock and key when not in use and manually logging users to track a chain of custody. But such approaches are labor intensive and subject to human error. We are long overdue for a more automated approach.

Today, many deployed applications rely on removable data storage devices for the purpose of collecting and transporting data in a secure fashion. For example, military airborne ISR (Intelligence, surveillance and reconnaissance) involves the collection of vast amounts of surveillance video. In fact, removeable storage devices are a key part of the mission workflow. Before each mission, the flight crew receives a mission plan on an encrypted disk drive that contains detailed information such as maps, waypoints, destination coordinates, and other mission-specific requirements. At the end of each mission, the encrypted disk, which now contains the confidential payload, must be transported to a secure location. Both the mission plans and the payload, i.e., the recorded video, must be securely stored. Access to the video must be restricted to authorized personnel only.

The greatest challenge with removeable storage is that once it is removed from the host, it is impossible to know for sure what data is on the drive and which users should be allowed to access it. There may be a physical label on the drive, but the information on the label may be incorrect or out of date or the label might fall off over time. Furthermore, it would significantly improve security if the drive contained metadata such as the name of the owner of the data, a list of users who are allowed to access the drive and which users have accessed it, whether the drive is encrypted and whether a user has the proper encryption key to unlock it. Moreover, it would improve operational efficiency to know characteristics of the drive such as the storage capacity and whether there is any room for more data, or how long the drive has been in service and whether it is time for maintenance or retirement.

The present invention is an innovative removable secure storage solution that allows users to automatically enforce data security policies. It is a rugged removable solid state device (SSD) module that is unique in its ability to dynamically generate a label that is written to its built-in e-paper display. The label automatically updates to ensure that it accurately describes user data, security data, and administrative data. This information about the drive is stored in a database in non-volatile memory on the device. Information in the drive database is also used to automatically enforce data encryption and user access policies. The present invention introduces innovations that automatically encrypt the drive contents and dynamically generate a digital label that is visible on the built-in display. The label accurately describes the contents and other attributes of the drive including maintenance data such as hours in use and user access controls. A software utility program allows users to configure the label contents and the user access policies that will be automatically enforced when the drive is deployed.

For applications that require specialized storage devices other than industry-standard SSD formats, such as the digital media cartridges or portable SSDs used in movie cameras, the present invention provides for a docking station which connects to the specialized storage device and copies the data to the SSD while encrypting the data and configuring the metadata necessary to create the e-paper label. Today, the majority of data is at some point collected, transmitted or stored electronically. In order to store data electronically it is often transferred to some kind of storage medium, such as a hard drive. More recently, the storage medium of choice has become a SSD. The present invention proposes an improvement to the way we utilize SSD technology.

An SSD is a type of non-volatile storage media that stores persistent data on solid-state flash memory. Two key components make up an SSD: a flash controller and NAND flash memory chips. The architectural configuration of the SSD controller is optimized to deliver high read and write performance for both sequential and random data requests. SSDs are sometimes referred to as flash drives or solid-state disks.

Unlike a hard disk drive (HDD), an SSD has no moving parts to break or spin up or down. A traditional HDD consists of a spinning disk with a read/write head on a mechanical arm called an "actuator". The HDD mechanism and hard disk are packaged as an integrated unit. Businesses and computer manufacturers have used spinning disks historically, owing to their lower unit cost and higher average durability. However, SSDs are now common in desktop and laptop PCs.

A spinning HDD reads and writes data magnetically, which is one of the oldest forms of storage media in continuous use. The magnetic properties, however, can lead to mechanical breakdowns. Conversely, an SSD reads and writes the data to a substrate of interconnected flash memory chips, which are fabricated out of silicon. Manufacturers build SSDs by stacking chips in a grid to achieve varying densities.

To prevent volatility, SSD manufacturers design the devices with floating gate transistors (FGRs) to hold the electrical charge. This allows an SSD to retain stored data even when it is not connected to a power source. Each FGR contains a single bit of data, designated either as a 1 for a charged cell or a 0 if the cell has no electrical charge.

SSDs had origins in the 1950s with two similar technologies: magnetic core memory and card capacitor read-only store (CCROS). These auxiliary memory units (as contemporaries called them) emerged during the era of vacuum-tube computers. But with the introduction of cheaper drum storage units, their usage ceased.

Later, in the 1970s and 1980s, SSDs were implemented in semiconductor memory for early computing companies, but they were seldom used because of the prohibitively high price. In the late 1970s, the advent of an electrically-alterable ROM (EAROM), which operated somewhat like the later NAND flash memory became the primary medium of electronic storage.

In 1983, a mobile computer was the first to include four slots for removable storage in the form of flash-based solid-state disks, using the same type of flash-memory cards. Flash modules did have the limitation of needing to be re-formatted entirely to reclaim space from deleted or modified files; old versions of files which were deleted or modified continued to take up space until the module was formatted.

However, even as hard drives found a place in many computer systems, RAM-based storage systems were also being created. The high cost of computer memory, its complexity, size, and requirement to stay powered to work prevented solid state-based storage from catching on in any meaningful way. As a result, these expensive systems only found use in the supercomputing and mainframe computer markets.

Eventually non-volatile RAM became fast, reliable and inexpensive enough that SSDs could be mass-produced, but it was still by degrees. They were incredibly expensive. By the early 1990s, you could buy a 20 MB SSD for a PC for $1,000, or about $50 per megabyte. By comparison, the cost of a spinning hard drive had dropped below $1 per megabyte, and would plummet even further.

The real breakthrough happened with the introduction of flash-based SSDs. By the mid-2000s, companies were flooding the market with flash SSDs that acted as drop-in replacements for hard disk drives. SSDs have gotten faster, smaller and more plentiful. Now PCs and Macs and smartphones all include flash storage of all shapes and sizes and will continue to move in that direction. SSDs provide better performance, better power efficiency, and enable thinner, lighter computer designs.

Due to the vast amounts of data being collected and recorded, companies have had no choice but to create and manage plans for electronic records. These plans typically include a strategy related to the location where records will be kept, and the likelihood of access to those resources compared to the cost of maintaining them. Additionally, most corporations have had to determine which data to maintain offline and which data to maintain online. Finally, companies have had to create policies pertaining to which users will have what type of access to specific data.

Importantly, the growth of the SSD has also correlated with the growth of data centers. More than ever, data is being harnessed and recorded. As a result, companies have had to expend significant resources on planning related to electronic information on SSDs. These plans have necessitated companies to keep detailed documents and notes regarding the specific strategy associated with the content kept on each individual drive. As a result, the only way to determine administrative or other information related to a particular drive is through accessing databases of information or by accessing each SSD and determining the administrative rules related to that specific device. This can be cumbersome, use unnecessary energy, and can be quite time consuming.

In light of the issues related to SSD and data storage management, the present invention contemplates the use of e-paper in conjunction with an SSD to provide the requisite information on the skin of a drive itself.

E-Paper is any type of display which emulates the appearance of paper, and there are a few different technologies that come under this umbrella. As a rule, e-paper displays are reflective rather than emissive, which means that they rely on external light sources rather than emitting their own light like LCD or LED displays.

E-paper displays are bi-stable, and reflective, meaning that no power is needed to retain an image, and ambient light reflects from the surface of the display. They contain millions of miniscule capsules filled with a clear fluid containing microscopic particles of different colors and electrical charges. Electrodes located above and below the capsules move up and down when a positive or negative electric field is applied, which makes the surface of the e-paper display reflect a certain color.

The main advantages of e-paper over traditional LCD screens are paper-like readability and extremely low power consumption. E-paper reduces eyestrain since it simulates paper rather than a computer screen. E-paper is easier to read outdoors and in bright sunlight; therefore, it is well-suited for indoor and outdoor displays, such as traffic signs, retail shelf labels, interactive museum signs, notice boards and passenger information boards.

E-paper displays provide high-resolution and no glare visibility, allowing users to view text and pictures clearly and at any angle. GDS G+Natural-Light™ in-built front light affords the same viewing experience in the dark. E-paper power consumption is really minimal since e-paper displays need no power to display an image; they simply use power to change the content.

Previous attempts to utilize e-paper in conjunction with storage media have been limited. For example, prior devices have only used the e-paper to show the storage capacity of the drive, rather than providing a link between the e-paper content and specific requisite information.

The present invention proposes a method of combining e-paper with modern SSDs such that the e-paper display derives dynamic display information from the SSD itself. The administrative data being located on the SSD can then be displayed on the e-paper. Relevant information will thus be available on the face of the drive itself, thereby limiting the need for expending significant resources for manually cataloging scene information and creating handwritten labels for the dailies.

SUMMARY OF THE INVENTION

The present invention discloses a method of integrating a non-volatile display, such as an e-paper with an electronic storage medium, including, without limitation a self-encrypting solid-state memory device. The embodiments disclosed herein utilize existing e-paper technology coupled with a receiver that can access various types of information to be displayed on the e-paper. This information can be dynamic user data, administrative data, security data, or other information. The receiver may obtain this information via wireless communication, through meta data on the storage medium, through a direct link through the storage medium or other related methodology. In particular, by coupling the receiver with the storage medium and the e-paper, dynamic information previously cumbersome to find will be easily accessible and readable.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION OF THE PREFERRED EMBODIMENT

Figure 1:
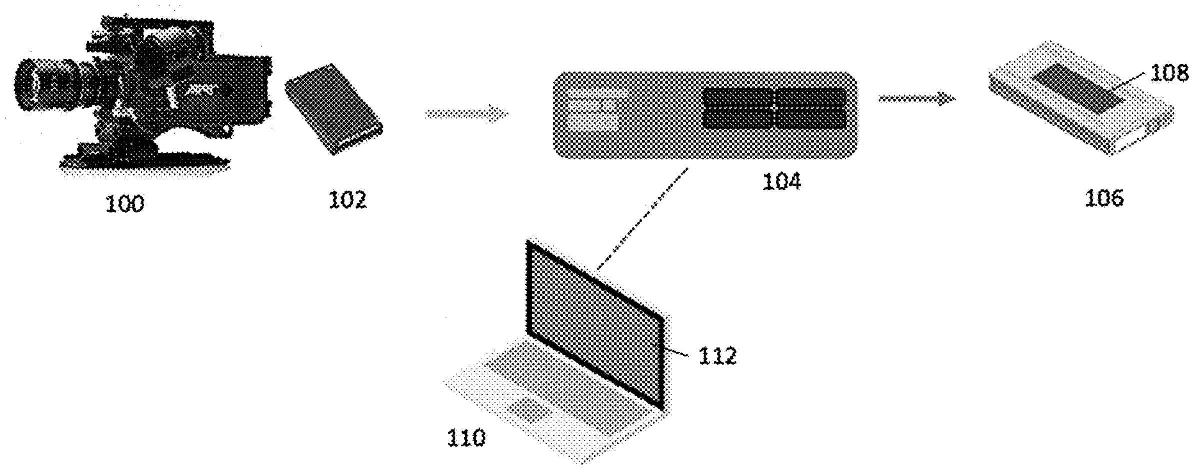
FIG. 1 is an overview of the proposed invention.

References will now be made in detail to a few embodiments of the invention, and examples of such are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

The present disclosure uses a digital media cartridge which will replace the digital media devices currently used in certain cameras used in the film industry. The digital media cartridges will automatically encrypt the data before storing it on the device.

The present disclosure also uses a solid state drive ("SSD") with an e-paper display as an exemplary case to illustrate the inventive concept. The inventive concept may be applied to any other data storage technologies and to any other types of displays, which do not consume electrical power when the displayed message or image is not altered.

The present disclosure also uses a docking device which is used to read the digital media cartridge and copy its contents to an SSD. When contents are copied to the SSD, the docking device and its associated software ensure that the contents are encrypted before being written to the SSD.

The term "SSD" refers to a storage device that uses non-volatile semiconductor memory, or flash memory, to store data. The SSD is generally used for the replacement of the hard drive.

In an exemplary embodiment, the SSD casing has an e-paper display attached in order to display information related to the SSD contents and administrative settings.

E-paper is a display technology designed to mimic the appearance of ordinary ink on paper. Unlike a conventional LCD (Liquid Crystal Display), which uses a backlight to illuminate its pixels, e-paper reflects light like ordinary paper and is capable of holding text and images indefinitely without consuming electric power, while allowing the image to be changed later.

An e-paper display is reflective and no electric power is consumed if the messages or the images are not altered. The messages or images displayed can be changed dynamically. For example, advertising messages may be selected based on the user's personal profile, the purchase history and the location as defined by the device where the message is delivered. Where power is applied to an e-paper screen, it is often used to update the displayed content.

In one embodiment, the e-paper screen is attached to any power source, such as a battery, in order to facilitate dynamic updates to the content. Because the e-paper displays consume electric power only when they change their display contents, the battery may last a very long time. The power supply may also be a solar panel on one of the surfaces of an SSD.

The present disclosure provides an SSD suitable for receiving data and electric power from a reader/writer wirelessly. The SSD includes a main body, an e-paper, an e-paper driver and a receiving unit. The e-paper is disposed at the main body. The e-paper driver is disposed at the main body and is electrically connected to the e-paper. The receiving unit is disposed at the main body and is electrically connected to the e-paper driver and the SSD. The receiving unit receives the data and the electric power for transferring the electric power to the e-paper driver and transferring the data to the e-paper driver. The e-paper driver causes the e-paper to display information according to the data when the electronic power is enabled.

In an exemplary embodiment of the present disclosure, the main body has an opening for exposing the e-paper.

According to the above descriptions, the SSD of the present disclosure can receive data and electric power wirelessly from the far-end reader/writer through the receiving unit, so as to power the e-paper of the SSD, and drives the e-paper to display information according to the data, so that the user can directly view the SSD to obtain the information therein.

FIG. 1 is an overview of the present invention. In accordance with the preferred embodiment of the present invention, the camera cartridge 102 is used to store a digital recording of the movie scenes captured by a camera 100 during filming. The contents of the camera cartridge 102 can be copied and transferred to SSD 106 by inserting both the cartridge 102 and the SSD 106 into the docking station 104 and initiating commands using a software graphical user interface (GUI) 112 running on a personal computer (PC) 110 connected to the docking station 104. The software graphical user interface (GUI) 112 allows a user to design a virtual label that will appear in the e-paper display 108. The contents of the virtual label are stored in a database in non-volatile memory on the SSD which can be configured using the GUI. The virtual label can be made to automatically populate based on the database, contents of the SSD, and any stored operational data about the SSD.

Figure 2:
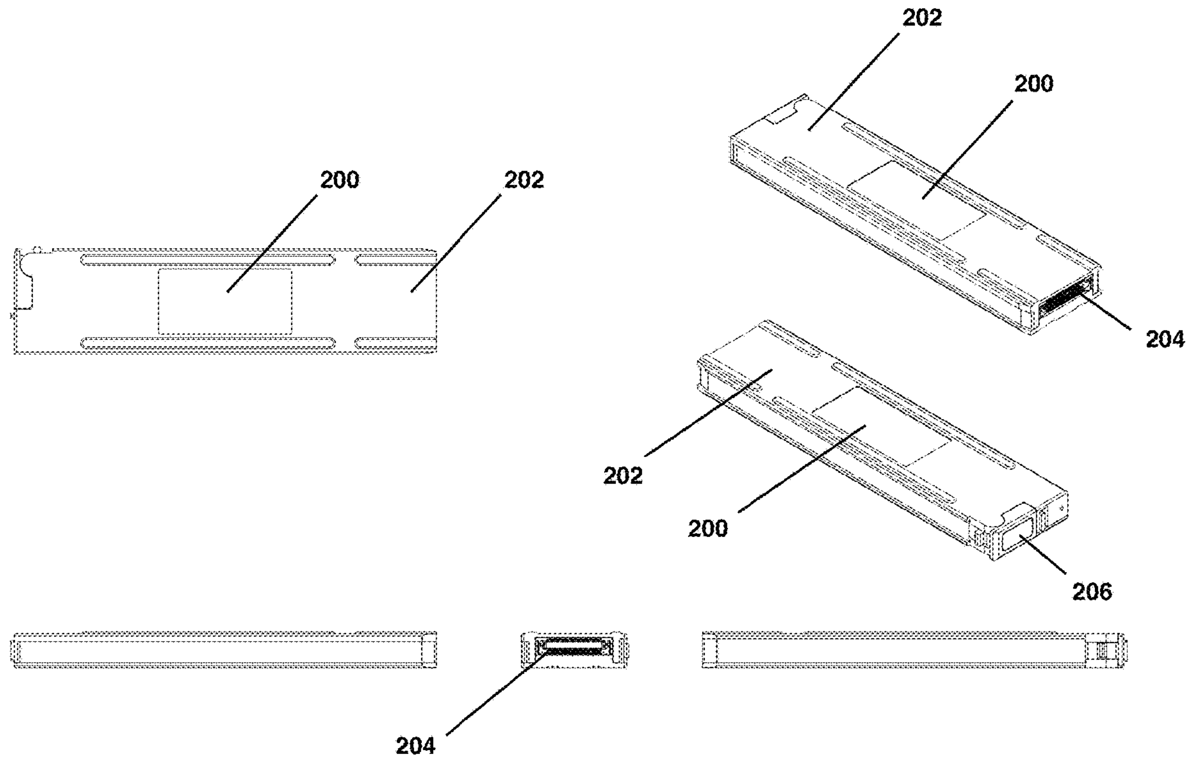
FIG. 2 is a rendering of the SSD element in the present invention.

FIG. 2 is a rendering of the SSD element of the present invention. In accordance with the preferred embodiment of the present invention, the e-paper 200 is mounted on a case 202. The case has a PCI or related slot capable of connecting with an existing solid state drive 204. The case further has the ability to connect to a power source and pass display data to the e-paper 206.

Figure 3:
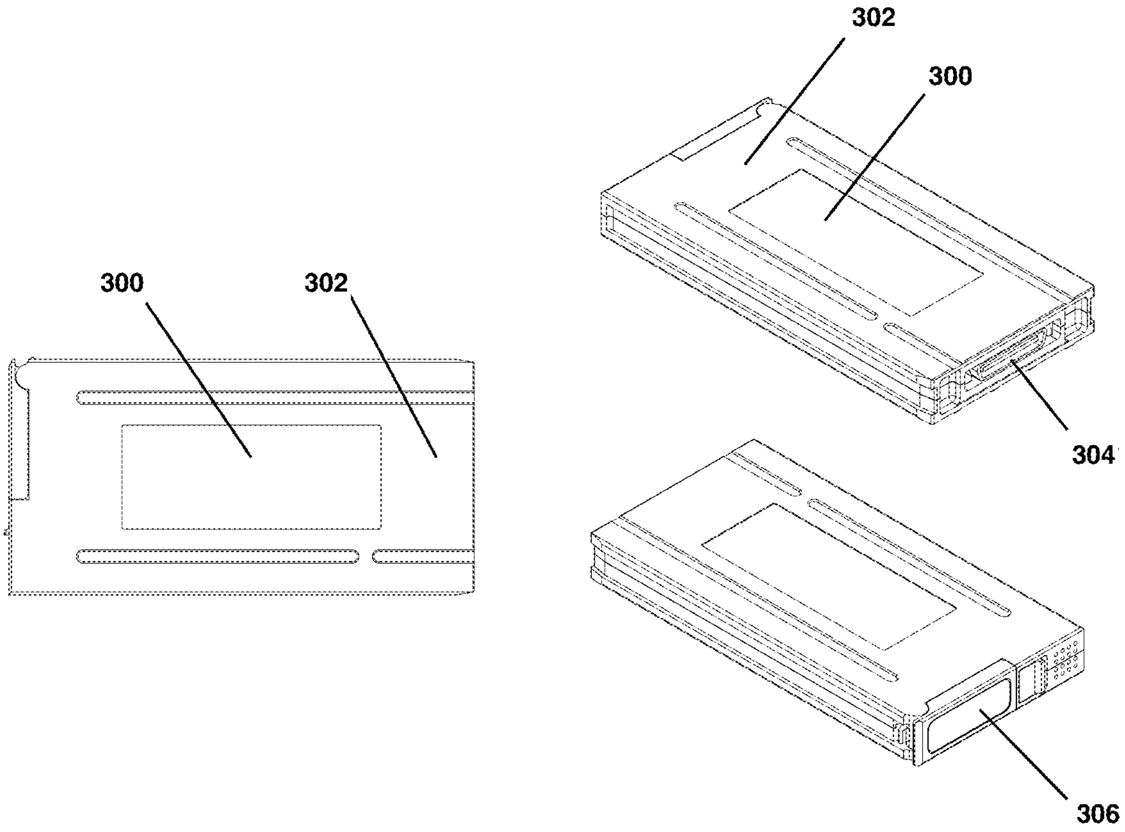
FIG. 3 is an alternative rendering of the SSD element in the present invention.

FIG. 3 is an alternative rendering of the present invention. In accordance with the preferred embodiment of the present invention, the e-paper 300 is mounted on a case 302. The case has a PCI or related slot capable of connecting with an existing solid-state drive 304. The case further has the ability to connect to a power source and pass display data to the e-paper 306.

Figure 4:
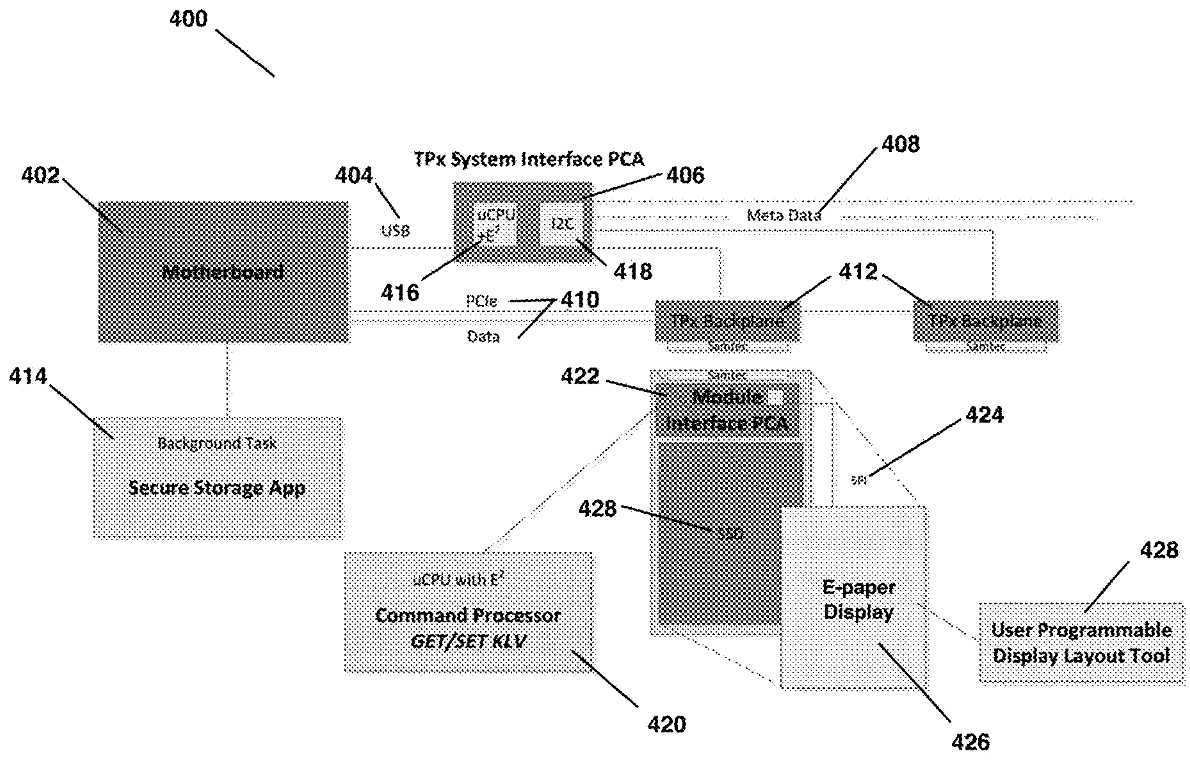
FIG. 4 is a diagram of the system architecture of the SSD element of the present invention.

FIG. 4 is a diagram of the system architecture of the SSD element of the present invention. In accordance with the preferred embodiment of the present invention, the SSD system 400 is comprised of the Motherboard 402, the TPx System Interface PCA 406, the TPx Module Interface PCA 422, and the e-paper display 426. In one exemplary embodiment, the Motherboard 402 hardware is connected via one USB port 404 internally cabled to TPx System Interface PCA 406, as well as one PCIe link (2 or 4 lanes) 410 to TPx backplane connector 412 for each removable module. When the Secure Storage Application 414 starts up as a background task at boot up, this process executes an authorization process to enable access to each module by providing an encryption key or other unlocking data. The process executes a protocol to control the exchange of KLV metadata 408 stored in the system TPx Interface PCA 406 and each TPx EEPROM 416.

The TPx System Interface PCA 406 hardware has a uCPU with EEPROM 416 and a USB link 404 to the motherboard 402, Secure Storage Application 414, and a multiport I2C link 418 to each TPx backplane 412. I2C 418 could be software or use a hardware multiplexer. The PCA 406 needs to be mounted inside the chassis convenient to cable routing to the TPx modules. It can be powered from the motherboard 402 USB port 404. The uCPU 416 serves two purposes: to respond to GET/SET KLV commands 420 for metadata stored in its EEPROM (System metadata) 408; and to transparently pass GET/SET KLV commands 420 between the system Secure Storage App 414 and each TPx module (Drive metadata) 422.

The TPx Module Interface PCA 422 hardware consists of: a uCPU with EEPROM 420; I2C link to system TPx Interface PCA 418; and an SPI link 424 to e-paper display 426. The TPx Module Interface PCA 422 has control over a designated pin that prevents SSD 428 access until authorized (PWRGD, PRSNT, or Hot-Swap circuit). The uCPU 420 serves two purposes: to provide a I2C link 418 to the Secure Storage App 414 (via the TPx Interface PCA) 406; and to exchange metadata 408 with the Secure Storage App 414 by responding to GET/SET KLV commands 420, in order to manage the e-paper display 426 by executing the KLV display protocol 420. The Secure Storage App 414 is a component of the software graphical user interface (GUI) 112.

The E-paper Nonvolatile Display 426 hardware consists of a nonvolatile display 426 mounted on the module cover that has X by Y character positions addressed with a SPI interface 424 controlled by the uCPU 420 on the Module Interface PCA 422. The E-paper Nonvolatile Display 426 has a user programmable interface that enables custom display formats and rules for frequency of updates, through a User Programmable Display Layout Tool 428. The Display Layout Tool 428 is a component of the software graphical user interface (GUI) 112.

Figure 5:
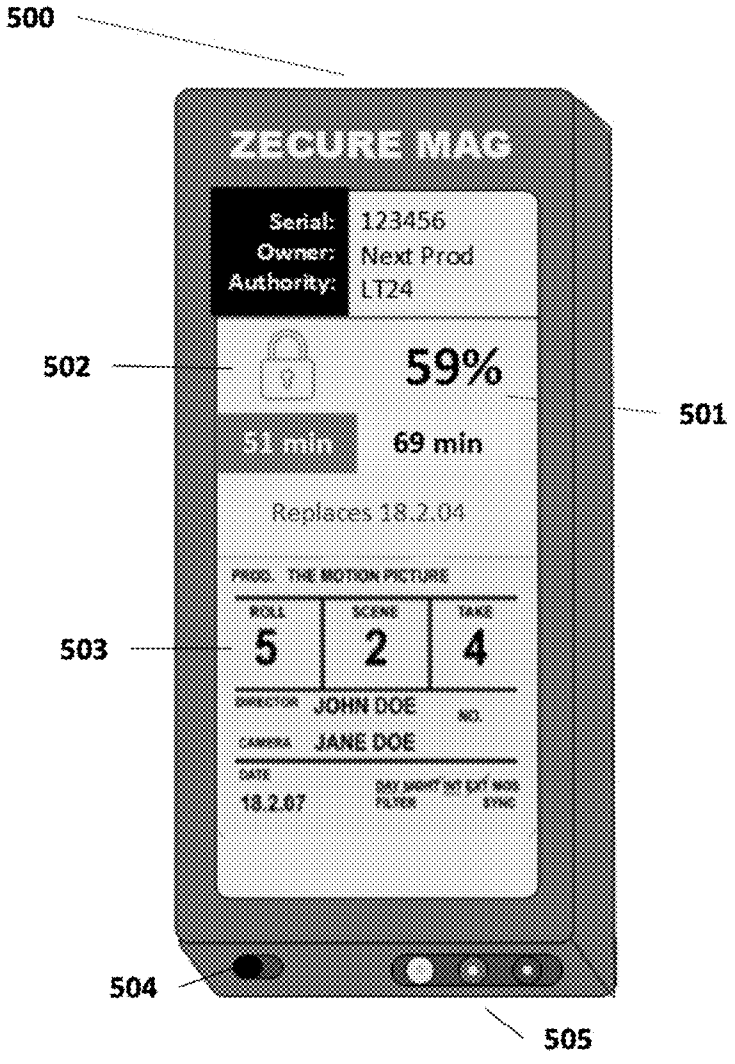
FIG. 5 is a rendering of the present invention showing the e-paper display embedded on the outside of the SSD element.

FIG. 5 is a rendering of the present invention showing the e-paper display embedded on the outside of the SSD element 500. The label has been customized for filmmaking applications to indicate roll, scene, and take 503. A padlock symbol 502 indicates that the contents are write protected. The unused capacity of the SSD is indicated as a percentage of the total available space and also as the remaining filming time. A switch at the bottom of the SSD enables and disables write protection 504. LEDs on the bottom edge indicate disk activity and drive status 505.

Figure 6:
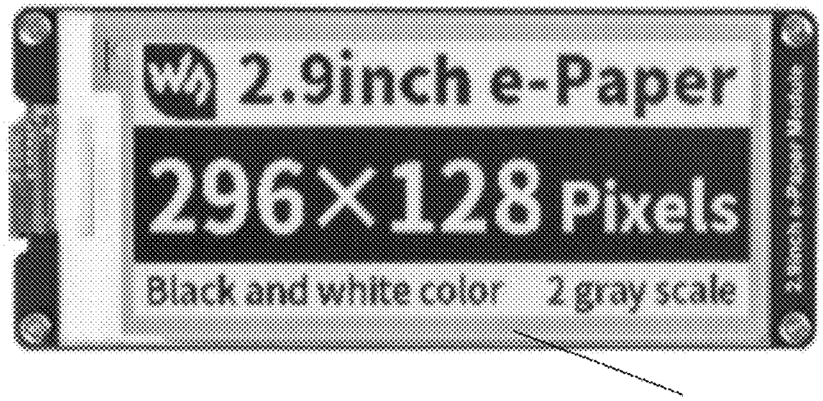
FIG. 6 is a rendering of the present invention showing an example of the types of metadata that can be stored on the device and written to the e-paper display.

FIG. 6 is a rendering of the present invention showing an example of the types of metadata that can be stored on the device and displayed on the e-paper label. In this example, the user is customizing the label for a military ISR mission 603. The label will display mission information including the name of the mission, the security classification of the mission payload, the date the mission data was captured. Also shown is whether the drive is locked by encryption, the serial number of the drive, the owner of the drive, how many hours the drive has been in use, and the total and remaining capacity of the drive.

Figure 7:
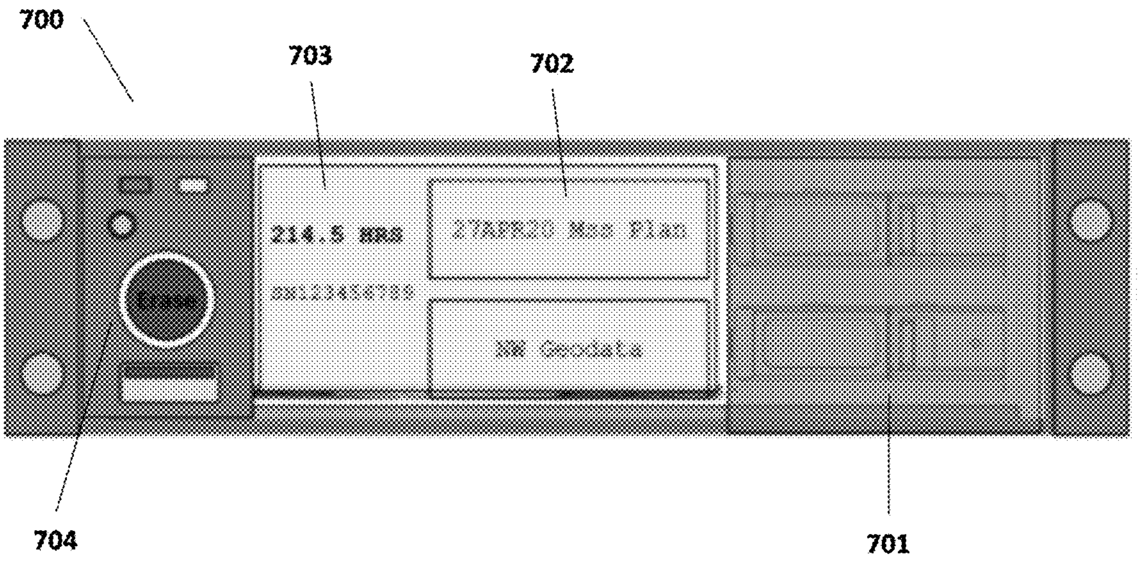
FIG. 7 is a rendering of the present invention showing the e-paper display connected to the SSD element but attached to the outside of the host computer.

FIG. 7 is a rendering of the present invention showing the e-paper display connected to the SSD element but attached to the outside of a host computer 700. Two SSDs are shown 701 installed in a host computer and the e-paper label for the drives is shown on the front of the computer 703. A portion of the label 703 is partitioned to display label information for each individual drive 702. An erase button 704 is shown which allows the encrypted contents of the drives to be instantly erased in the event there is an imminent threat of capture by hostile forces.

In an exemplary embodiment, the data displayed on the e-paper is dynamic user data. Said data is transferred initially from the SSD or other source to a receiver, and the receiver passes the information to be displayed on the e-paper.

In an exemplary embodiment, the data displayed on the e-paper is a serial number. Said serial numbers can be used to validate the drive or user device compatibility with said drive.

In another exemplary embodiment, the data displayed on the e-paper is a usage log, including information such as user IDs, access time, and access dates. Said e-paper is coupled to the SSD directly, or through some other medium, such as an external SSD case, and initially receives the information wirelessly, or through the SSD.

In one exemplary embodiment, the information displayed on the e-paper is threshold notifications regarding security, capacity, or usage count. This information can change after set intervals. In such an embodiment, the e-paper display may be connected to a power source or draw power from the SSD which may be connected to a power source. Such a power source may be a battery, a power supply, or other power device.

In one embodiment, a system for writing information to the e-paper includes a writing module and an erasing unit connected to the writing module. The erasing unit is configured to erase information stored in the e-paper. The system also includes a writing unit connected to the writing module and is configured to write information to the e-paper. Information is written to the e-paper by orienting the writing module so that the e-paper passes the erasing unit prior to passing the writing unit.

An exemplary use case for the SSD connected to an e-paper display relates to modern film clapperboards. In the modern world of filmmaking, video footage is more often than not stored on SSDs. When the film is shot, specific data within the SSD is footage of a film clapperboard. A film clapperboard contains two main types of information:

The first type of information is Production Information, such as: "Prod." for the name of the video/movie or production, "Director" for the name of the director, and "Camera" for the name of the camera man, videographer or cinematographer. Also, this can be used to label which camera is being used for that shot and the "Date" for labeling the date the shot was done on.

The second type of information is Shot Information, which relates to the footage, such as: "Roll" to identify the film roll or video tape that you are using, (However, with today's filmmakers and videographers shooting with digital media, Roll is now being used to identify the digital media card that is being used during the shot.) "Scene" to identify the scene you are shooting and "Take" to identify the current take. For example, Scene 1 Take 1 would mean to refer to footage that is the first scene shot for the first time. If the scene was redone, a clapperboard indicating Scene 1 Take 2 would be included. The take will increment by one each time you have to re-shoot the scene.

Given that the information is typically buried within the SSD or in the footage itself, it can be difficult to find specific scenes or information. One embodiment of the present invention proposes a system by which the relevant shots can be stored on various SSDs. Each SSD would contain an e-paper that would display a listing of the scene contents within the drive. Thus, the user of the SSD can quickly sift through various SSDs to find the specific shot needed. In addition, under such an embodiment, the information to be displayed on the e-paper can be simply stored as metadata. The metadata can be used to pass the information to the e-paper and quickly summarizes the characteristics of the data stored within the SSD.

In one or more various aspects, related systems include but are not limited to circuitry and/or programming for effecting the herein-referenced method aspects; the circuitry and/or programming may be virtually any combination of hardware, software, and/or firmware configured to affect the herein-referenced method aspects depending upon the design choices of the system designer.

For one or more portions of one or more regions of an e-paper assembly having one or more display layers, a method includes, but is not limited to: circuitry for one or more position obtaining modules configured to direct obtaining first information regarding one or more positions of one or more portions of one or more regions of the e-paper assembly and circuitry for one or more physical status sending modules configured to direct sending one or more e-paper assembly physical status related information portions to the e-paper assembly based upon the obtaining of the first information. In addition to the foregoing, other method aspects are described in the claims, drawings, and text forming a part of the present disclosure.

For one or more portions of one or more regions of an e-paper assembly having one or more display layers, a method includes, but is not limited to: means for one or more position obtaining modules configured to direct obtaining first information regarding one or more positions of one or more portions of one or more regions of the e-paper assembly and means for one or more physical status sending modules configured to direct sending one or more e-paper assembly physical status related information portions to the e-paper assembly based upon the obtaining of the first information. In addition to the foregoing, other method aspects are described in the claims, drawings, and text forming a part of the present disclosure.

Those with ordinary skill in the art will recognize that the state of the art has progressed to the point where there is little distinction left between hardware and software implementations of aspects of systems; the use of hardware or software is generally (but not always, in that in certain contexts the choice between hardware and software may become significant) a design choice representing cost vs. efficiency tradeoffs. Those having skill in the art will appreciate that there are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or a virtually unlimited number of combinations thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the purview of one with skill in the art. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

In a general sense, those skilled in the art will recognize that the various aspects described herein which may be implemented, individually and/or collectively, by a wide range of hardware, software, firmware, or any combination thereof may be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application-specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those of ordinary skill in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. An e-paper system disposed upon a surface of an electronic data storage unit comprising:

a solid state data acquisition device configured to acquire and transfer digital media data, and wherein said digital media data is stored within said electronic data storage data unit;

a digital display, attached and electrically connected to said solid state data acquisition device for abstracting and editing said stored data to form a stream of descriptive data on said digital display;

a graphical user interface in communication with said digital display for transmitting said digital media data thereto, for gathering said stream of descriptive data, and for formatting it for display upon said digital display disposed upon a non-volatile digital display surface of said electronic data storage unit;

a digital media cartridge that automatically encrypts said digital media data before storing said digital media data on said device, wherein a docking device is used to read said digital media cartridge and copy contents of said digital media cartridge to said solid state data acquisition device; and a mission metadata module presented on said digital display in communication with said graphical user interface, wherein said descriptive data presented on said digital display and stored within said electronic data storage unit includes metadata, and wherein said metadata provides device security information and passes said information and summarizes characteristics of the data stored and wherein said descriptive data stored within said electronic data storage unit is output to an e-paper displayed upon a non-volatile digital display surface of said electronic data storage unit.

2. An e-paper system according to claim 1 wherein said data stored within said electronic data storage unit includes data representative ownership, version and date last used, security class and capacity available.

3. An e-paper system according to claim 2 wherein said data stored within said electronic data storage unit is output to an e-paper displayed upon the non-volatile display surface of said electronic data storage unit.

4. The system of claim 1, further comprising of a solid state data acquisition device's receiver coupled to said electronic data storage unit so all iterations of said digital media data is readily accessible on said digital display.

5. The system of claim 1, further comprising of formatting prompts for said descriptive data reflected on said digital display.

6. The system of claim 5, wherein said formatting prompts on said digital display are configured to a user programmable interface.

7. The system of claim 6, wherein said user programmable interface enables custom display formats and rules for frequency of updates through a user programmable display layout tool.

8. The system of claim 1, wherein said digital display depicts an unused capacity of said solid state data acquisition device as a percentage.

9. The system of claim 1, wherein said solid state data acquisition device features encrypted storage options, including an ability to remove all data contents during a data breach event.

10. The system of claim 9, further comprising of a solid state data acquisition device's receiver coupled to said electronic data storage unit so all iterations of said digital media data is readily accessible on said digital display.

11. The system of claim 9, further comprising of formatting prompts for said descriptive data reflected on said digital display.

12. The system of claim 11, wherein said formatting prompts on said digital display are configured to a user programmable interface.

13. The system of claim 12, wherein said user programmable interface enables custom display formats and rules for frequency of updates through a user programmable display layout tool.

14. The system of claim 9, wherein said digital display depicts an unused capacity of said solid state data acquisition device as a percentage.

15. The system of claim 9, wherein said solid state data acquisition device features encrypted storage options, including an ability to remove all data contents during a data breach event.

16. The system of claim 9, wherein said e-paper and said digital display stores said data within said electronic data storage unit and generates an output to said e-paper displayed upon the surface of said electronic data storage unit.

17. A method for labelling a surface of an electronic data storage unit using e-paper system disposed upon a surface of said electronic data storage unit for indicating contents of said electronic data storage unit comprising:

activating a first solid state computer memory for acquiring data stored within said electronic data storage data unit and solid state data acquisition device;

abstracting and editing said stored data to form a stream of descriptive data on a graphical user interface in communication with a digital display on said solid state data acquisition device;

activating a second solid state computer memory for gathering said stream of descriptive data and formatting it for presentation and transmission on an e-paper digital display disposed upon a non-volatile digital display surface of said electronic data storage unit for observation by human users of said system;

encrypting automatically digital media data via a digital media cartridge before storing said digital media data on said device, wherein a docking device is used to read said digital media cartridge and copy contents of said digital media cartridge to said solid state data acquisition device; and presenting a mission metadata module on said digital display in communication with said graphical user interface, wherein said descriptive data presented on said digital display and stored within said electronic data storage unit includes metadata, and wherein said metadata provides device security information and passes said information and summarizes characteristics of the data stored and wherein said descriptive data stored within said electronic data storage unit is output to an e-paper displayed upon a non-volatile digital display surface of said electronic data storage unit.

18. A method for using e-paper according to claim 17 wherein said data stored within said electronic data storage unit includes data representative ownership, version and date last used, security class and capacity available.

19. A method for using e-paper according to claim 18 wherein said data stored within said electronic data storage unit is output to an e-paper displayed upon the surface of said electronic data storage unit.

20. An e-paper system disposed upon a surface of an electronic solid state drive data storage unit comprising:

a first electronic solid state data acquisition device for acquiring digital media data, and wherein said digital media data is stored within said electronic data storage data unit;

a digital display, attached and electrically connected to said solid state data acquisition device for abstracting and editing said stored data to form a stream of descriptive data on said digital display;

a graphical user interface in communication with said digital display for transmitting said digital media data to said digital display;

a second electronic solid state drive data transmission device for gathering said stream of descriptive data and formatting it for display upon said digital e-paper display disposed upon the surface of said electronic data storage unit;

a digital media cartridge that automatically encrypts said digital media data before storing said digital media data on said device, wherein a docking device is used to read said digital media cartridge and copy contents of said digital media cartridge to said solid state data acquisition device; and a mission metadata module presented on said digital display in communication with said graphical user interface, wherein said descriptive data presented on said digital display and stored within said electronic data storage unit includes metadata depicting representative ownership, document and device versions and date last used, security class and capacity available, and wherein said metadata provides device security information and passes said information and summarizes characteristics of the data stored and wherein said descriptive data stored within said electronic data storage unit is output to an e-paper displayed upon a non-volatile digital display surface of said electronic data storage unit.

* * * * *